(12) United States Patent
Feuerstraeter et al.

(10) Patent No.: US 7,804,847 B2
(45) Date of Patent: ***Sep. 28, 2010

(54) INTERFACE AND RELATED METHODS FOR RATE PACING IN AN ETHERNET ARCHITECTURE

(75) Inventors: Mark T. Feuerstraeter, Granite Bay, CA (US); Bradley J. Booth, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 11/876,651

(22) Filed: Oct. 22, 2007

(65) Prior Publication Data

US 2008/0037585 A1 Feb. 14, 2008

Related U.S. Application Data

(63) Continuation of application No. 09/990,754, filed on Nov. 16, 2001, now Pat. No. 7,286,557.

(51) Int. Cl.
*H04J 3/22* (2006.01)
(52) U.S. Cl. .................. 370/465; 370/468; 709/233
(58) Field of Classification Search ............... 370/230, 370/231, 232, 233, 234, 235, 236, 241, 252, 370/431, 433, 437, 464, 465, 466, 468, 474, 370/476; 375/354, 355, 356, 358, 362, 363; 455/39, 68, 69, 70, 71, 72; 709/223, 224, 709/225, 226, 230, 232, 233, 234
See application file for complete search history.

(56) References Cited

U.S. PATENT DOCUMENTS

| | | | |
|---|---|---|---|
| 5,548,623 A | * | 8/1996 | Casper et al. ............... 375/358 |
| 5,596,575 A | | 1/1997 | Yang et al. |
| 5,991,303 A | | 11/1999 | Mills |
| 6,055,268 A | | 4/2000 | Timm et al. |

(Continued)

FOREIGN PATENT DOCUMENTS

WO WO-0070827 11/2000

(Continued)

OTHER PUBLICATIONS

"Interface and related methods for dynamic channelization in an ethernet architecture", *Final Office Action*, U.S. Appl. No. 09/990,916, (Dec. 28, 2007).

(Continued)

*Primary Examiner*—Seema S Rao
*Assistant Examiner*—Khoa Huynh
(74) *Attorney, Agent, or Firm*—Caven & Aghevli LLC (57) ABSTRACT

An interface and related methods for rate pacing in an Ethernet architecture are described herein. In an embodiment, an effective data rate of communication channel with a remote network device is reduced based, at least in part, on an identified processing capability of the remote network device. In one embodiment, to reduce the effective data rate, one or more idle control elements are inserted between at least two frames of substantive content based, at least in part, on the processing capability of the remote network device. Other embodiments are also disclosed.

19 Claims, 5 Drawing Sheets

U.S. PATENT DOCUMENTS

| | | | |
|---|---|---|---|
| 6,094,439 | A | 7/2000 | Krishna et al. |
| 6,169,729 | B1 | 1/2001 | Feuerstraeter |
| 6,215,816 | B1 | 4/2001 | Gillespie et al. |
| 6,275,497 | B1 | 8/2001 | Varma et al. |
| 6,559,692 | B2 | 5/2003 | Kimball et al. |
| 6,636,531 | B1 | 10/2003 | Nakashima et al. |
| 6,697,368 | B2 | 2/2004 | Chang et al. |
| 6,819,680 | B2 | 11/2004 | Hickman et al. |
| 6,862,293 | B2 | 3/2005 | Lay et al. |
| 6,912,199 | B1 * | 6/2005 | Liang ............... 370/236 |
| 6,973,031 | B1 | 12/2005 | Kalkunte et al. |
| 7,200,153 | B2 | 4/2007 | Feuerstraeter et al. |
| 2002/0071398 | A1 * | 6/2002 | Moran et al. ............ 370/252 |
| 2002/0137467 | A1 * | 9/2002 | Tzannes ............... 455/69 |
| 2003/0039211 | A1 | 2/2003 | Hvostov et al. |
| 2003/0058894 | A1 | 3/2003 | Feuerstraeter et al. |
| 2004/0003296 | A1 | 1/2004 | Robert et al. |
| 2004/0081145 | A1 * | 4/2004 | Harrekilde-Petersen et al. .. 370/362 |
| 2005/0220180 | A1 | 10/2005 | Barlev et al. |

FOREIGN PATENT DOCUMENTS

WO      WO-0176160      10/2001

OTHER PUBLICATIONS

"Interface and related methods for dynamic channelization in an ethernet architecture", *Non-Final Office Action*, U.S. Appl. No. 09/990,916, (Jul. 3, 2007).

"Interface and related methods for dynamic channelization in an ethernet architecture", *Final Office Action*, U.S. Appl. No. 09/990,916, (Jan. 11, 2007).

"Interface and related methods for dynamic channelization in an ethernet architecture", *Non-Final Office Action*, U.S. Appl. No. 09/990,916, (Feb. 27, 2006).

"Interface and related methods for dynamic channelization in an ethernet architecture", *Final Office Action*, U.S. Appl. No. 09/990,916, (Aug. 12, 2005).

"Interface and related methods for dynamic channelization in an ethernet architecture", *Non-Final Office Action*, U.S. Appl. No. 09/990,916 (Jan. 24, 2005).

Frazier, H. et al., "Comparison of Rate Control Methods", *IEEE P802.3ae 10 Gigabit Ethernet Task Force*, Ottawa ON, (May 24, 2000, pp. 3 and 9.

Alderrou, et al., "XAUI/XGXS Proposal", *IEEE 802.3ae 10 Gb/s Task Force May 2000 Interim Meeting*, Ottawa, ON, (May 23, 2005), pp. 7 and 15.

"802.3ae Criteria", *IEEE P802.3ae 10Gb/s Ethernet Task Force*.

Thatcher, J.."802.3ae Plenary Meeting, Jul. 11-12, 2000", *IEEE 802.3ae 10 Gb/s Task Force*, La Jolla, CA, p. 4.

"Media Access Control (MAC) Parameters, Physical Layer, and Management Parameters for 10 Gb/s Operation", *IEEE Draft P802.3ae/D3.3*, (Oct. 23, 2001), pp. i-ii, 14-42.

* cited by examiner

INTERFACE AND RELATED METHODS FOR RATE PACING IN AN ETHERNET ARCHITECTURE

RELATED APPLICATION

This application is a Continuation of U.S. Utility application Ser. No. 09/990,754 entitled "AN INTERFACE AND RELATED METHODS FOR RATE PACING IN AN ETHERNET ARCHITECTURE", filed on Nov. 16, 2001, which is incorporated herein by reference.

TECHNICAL FIELD

The present invention generally relates to the field of data networks and, more particularly, to an interface and related methods for rate pacing in an Ethernet architecture.

BACKGROUND

As computer technology has evolved, so too has the use of networks which communicatively couple computer systems together enabling remote computer systems to exchange information. One example of just such a network topology is the Ethernet standard topology, defined within the 802.3 standards committee of the Institute of Electronic and Electrical Engineers (IEEE). Over the last decade, the Ethernet standard has evolved from a 10 Mb/S standard to a 100 Mb/S standard to a 1 Gb/s standard and, more recently, a 10 Gb Ethernet standard, IEEE 802.3ae entitled *Local and Metropolitan Area Networks—Part* 3: *Carrier Sense Multiple Access with Collision Detection (CSMA/CD) Access Method and Physical Layer Specifications—Media Access Control Parameters, Physical Layers and Management Parameters for* 10 *Gb/s Operation* has been proposed, each of which are incorporated herein by reference.

As currently proposed, the 802.3ae Ethernet standard provides for a single, 10 Gb/s communication channel which is the aggregate of four lanes, each providing full-duplex data rate of 2.5 Gb/s of 8b/10b encoded data at a signaling rate of 3.125 Gb/s (or, 12.5 Gb/s for the aggregate channel). To place a 10 Gb/s data rate in context, the entire contents of a DVD could be transmitted through a 10 Gb/s link in less than six seconds. An example of an 802.3ae compliant network interface (NI) architecture is presented, with reference to FIG. 1.

Figure 1:
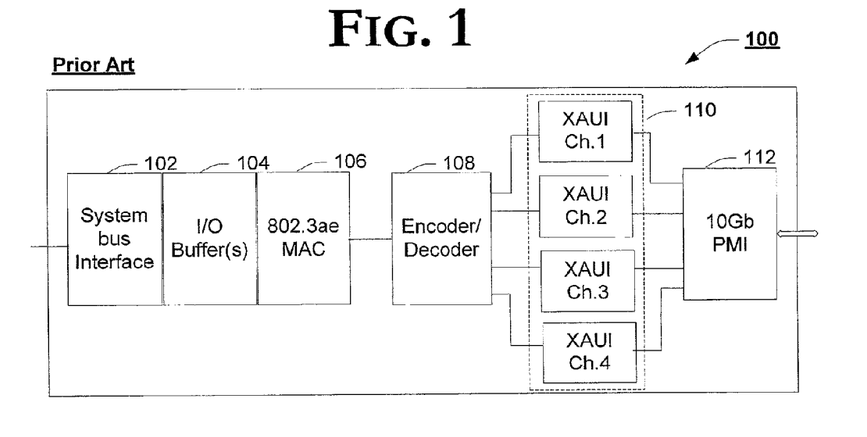
FIG. 1 is a simplified block diagram of an example conventional network interface, representative of prior art network interfaces.

Turning briefly to FIG. 1, a block diagram of a conventional 10 Gb/s network interface is presented. As shown, the conventional 802.3ae network interface includes a system bus interface 102, one or more input/output buffer(s) 104, an 802.3ae media access controller 106, an encoder/decoder 108 coupled to a 10 Gb/s attachment unit interface (XAUI) 110, and a 10 Gb/s transceiver 112. As used herein, the system bus interface 102 and the I/O buffers 104 effectively couple the 802.3ae MAC to processing elements of a host system. Content is received from the processing elements of the host via the interface 102 and buffered, as required, to/from the 802.3ae MAC. The 802.3ae MAC processes received data to facilitate communication over the network communication link. In this regard, 802.3ae MAC packetizes data for transmission, and de-packetizes information received from the communication link for promotion to the host processing elements. The 802.3ae MAC is coupled to an Encoder/Decoder 108 to provide signaling for packing 2×1G channels into a single 2.5G XAUI channel.

The 10G external attachment unit interface (XAUI) is depicted comprising four (4) channels, which establish four full-duplex communication "lanes", which are aggregated to provide the 10 Gb/s communication link through a physical media interface 112 (e.g., an optical transceiver). The XAUI interface 112 is used to extend the effective transmission length of the 802.3ae MAC, facilitating more flexibility in connecting the 802.3ae MAC to the physical media interface. In this regard, the XAUI interface performs additional encoding using the 8b/10b encoding scheme such that each of the four channels supports a data rate of 2.5 Gb/s over a signaling rate of 3.125 Gb/s (the difference allocated to encoding overhead). It will be appreciated that the physical media interface 112 may also perform additional coding (e.g., 64b/66b) in preparing the content for transmission over the physical medium.

While the impressive throughput of the 10 Gb Ethernet architecture offers the promise of eliminating network processing bottlenecks for a significant time to come, those skilled in the art will appreciate that current computing platforms cannot consume data at this rate. Thus, current implementations of a 10G Ethernet architecture will necessarily require significant buffering between 802.3ae compliant devices and more traditional computing resources (e.g., client computers, host systems, servers, and the like) to enable the conventional computing device(s) to consume data in accordance with its processing capabilities.

Another significant limitation lies in the fact that, as proposed, 802.3ae devices will not interoperate with legacy Ethernet interface(s) at the link-level (i.e., in the parlance of the Open Systems Interconnect (OSI) communication model). That is to say, unlike legacy Ethernet standards which provide for link-level compatibility by having the device "fall back" to the lowest common communication denominator (e.g., 10 Mb, 100 b or 1 Gb data rates), the proposed 802.3ae standard does not provide for such link-level compatibility with conventional Ethernet devices. This lack of backwards compatibility fails to offer consumers a migration path that allows them to upgrade individual components of a network as the need arises. Given the popularity of past Ethernet architectures, consumers have a significant investment in their Ethernet networking architecture and, consequently, are not likely to simply replace such network elements wholesale to make this upgrade.

Thus, while the 802.3ae standard proposal provides a roadmap of the future of Ethernet, a number of limitations stand in the way of early acceptance and adoption in the marketplace of 802.3ae-compliant devices. First, the communication rate of 802.3ae devices can quickly overwhelm host systems without significant buffering at the interface. Those skilled in the art will appreciate that the memory elements and associated control to provide such buffering add significant cost to the conventional 802.3ae interface.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

The present invention is generally directed to an interface and related methods for dynamic channelization in an Ethernet architecture. In this regard, a scalable network interface is introduced which effectively enables an 802.3ae-compliant device to interface with host systems without the need for significant buffering, and also provides an element of backwards compatibility with legacy Ethernet devices. According to one example implementation, a scalable network interface is introduced that identifies the communication and/or processing capability of a remote network device, and dynamically creates a virtual channel within the 802.3ae physical channel to communicate with the remote network device in accordance with its identified capability. Alternate embodiments of the dynamic channelization feature will be developed more fully below. Those skilled in the art will appreciate, from the discussion to follow, that the dynamic channelization features of the scalable network interface provides an element of backwards compatibility with legacy network devices.

In accordance with another aspect of the present invention, the scalable network interface introduces further throttles the communication channel established with a remote network device based, at least in part, on the processing capability of the remote network device. In this regard, a rate pacing element is presented which effectively reduces the data rate of a (virtual/physical) communication channel to any level below the channel data rate. Those skilled in the art will appreciate that the rate pacing element may well be used in conjunction with the dynamic channelization feature to generate a virtual channel of any data rate to suit the network interface and/or processing capability of other network elements. In this regard, a scalable interface and related methods enabling an 802.3ae compliant network device to effectively interface with legacy equipment is presented.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Scalable Network Interface

Figure 2:
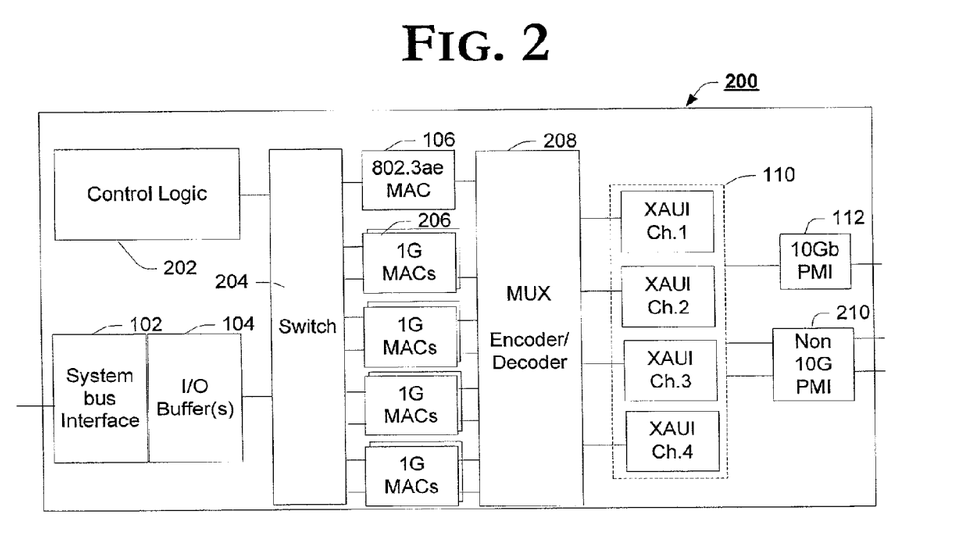
FIG. 2 is a block diagram of an example network interface incorporating the teachings of the present invention, in accordance with one example implementation of the present invention.

FIG. 2 provides a block diagram of an example scalable network interface in accordance with the teachings of the present invention. In addition to the elements found in the conventional 802.3ae network interface introduced above, the scalable network interface 200 is depicted comprising control logic 202, a switch 204, one or more 1 Gb/s MAC(s), a multiplexing encoder/decoder 208, and legacy physical media interconnect devices 210, each coupled as depicted. Although depicted as a number of disparate functional items, those skilled in the art will appreciate that one or more of such elements may well be combined into single functional entities. Alternatively, certain elements may be split into multiple functional elements. In this regard, alternate embodiments of greater or lesser complexity that nonetheless enables an 802.3ae compliant network interface to interact with legacy network elements is envisioned within the scope and spirit of the present invention.

As used herein, control logic 202 controls the scalability aspect of the network interface 200. In this regard, control logic 202 determines whether the interface 200 is coupled to an 802.3ae network or some legacy network (e.g., 1 Gb/s, 100 Mb/S, 10 Mb/S). According to one example implementation, control logic 202 utilizes auto-negotiation features to identify the communication rate supported by the remote network device. Any of a number of auto-negotiation techniques may well be used by control logic 202 in this regard. In accordance with one aspect of the present invention, developed more fully below, once control logic 202 has identified the communication capability of the remote network device, control logic 202 enables select interface resources to establish a communication channel within the 10 Gb/s signaling rate of the communication link 112 that is commensurate with the communication capability of the remote device. Although depicted as a separate functional entity for purposes of clarity, those skilled in the art will appreciate that at least this aspect of the control logic 202 may well be embodied within other physical or logical elements of interface 202. In one implementation, for example, the auto-negotiation features of control logic 202 are implemented within a physical media interface, such as the 10G physical media interface (PMI) of 802.3ae compliant devices. In this regard, control logic 202 is intended to represent any of a wide variety of control logic known in the art such as, for example, microprocessor(s), microcontroller(s), programmable logic device(s) (PLD), field programmable gate arrays (FPGA), state machine(s) and the like. Alternatively, control logic 202 may well be content (e.g., executable instructions) which, when executed by a computing appliance, implement the control features described herein.

As depicted, switch 204 routes data to/from communicatively coupled system(s) through I/O buffer(s) 104. According to one aspect of the present invention, switch 204 routes such information to/from one or more of the 802.3ae compliant MAC 106 and/or one or more of the 1 Gb/s MAC(s) 206. According to one example implementation, switch 204 receives control information from control logic (e.g., 202) to route content between the I/O buffer(s) 204 and the MAC(s) 106 and/or 206. In accordance with the illustrate example implementation, switch 204 is controlled via direct memory access (DMA) from control logic such as, e.g., control logic 202.

In accordance one example implementation of the present invention, interface 200 is endowed with one or more 1 Gb/s media access controller(s) (MAC) 206 to implement the dynamic channelization features of the present invention. That is, in accordance with one example implementation, network interface 200 includes one or more 1 Gb/s MAC(s), which are selectively engaged to 1Gb/s establish up to a sub-10 Gb/s data channel with a remote network device. In accordance with one example implementation, the sub-10 Gb/s data channel is a virtual channel established within the 10 Gb/s bandwidth of an 802.3ae communication link. In accordance with one example implementation, the sub-10 Gb/s data channel is established over a sub-10 Gb/s communication link (e.g., a conventional 1 Gb/s Ethernet link). As shown, each of the 1 Gb MACs 206 depicted are dual, 1 Gb/s MACs, each with an input and an output. As used herein, such MAC(s) perform packetization and encoding functions to generate 802.3 compliant datagrams for transmission to the receiving network device.

In accordance with another example implementation, described more fully below, an enhancement is made to a conventional 802.3ae MAC 106 that enables the 802.3ae MAC to establish a sub-10 Gb/s data channel over a 10 Gb/s communication link. As will be developed more fully below, in accordance with this example implementation, the enhanced 802.3ae MAC (or, as referred to herein, an enhanced 10G MAC (EXMAC)) selectively invokes a timeslicing mechanism (not particularly denoted) to establish a sub-10 Gb/s data channel (virtual channel) within the 10 Gb/s signaling channel. In accordance with one example aspect of this implementation of the present invention, the number of timeslots EXMAC invokes is based, at least in part, on the communication capability of the remote network device. According to one example implementation, EXMAC selectively parses the channel into ten (10) timeslots, each roughly approximating a 1 Gb/s data channel. EXMAC may utilize several of such timeslots to generate higher bandwidth data channel(s), or may well parse the 10 Gb/s bandwidth into more timeslots to effect lower bandwidth channel(s). According to one implementation, EXMAC receives 10G data and parses the 10G data in up to ten (10) 1 Gb/s virtual channels for delivery to communicatively coupled sub-10 Gb Ethernet interface(s).

In addition to that which is disclosed above, one or more of the 802.3ae MAC 106 or the 1 Gb/s MAC(s) 206 may be further enhanced with a rate pacing feature, in accordance with another aspect of the present invention. As will be developed more fully below, the rate pacing feature is selectively employed to lower the effective data channel rate within the 10 Gb/s signaling channel. According to one example implementation of the rate pacing feature (i.e., employed in conjunction with either the 10 Gb/s MAC or the 1 Gb/s MAC), the MAC selectively injects "idle" control indications between successive frames of content. In this regard, the one or more successive idle control elements separating the frames effectively reduces the rate of the data channel, e.g., to a rate that is acceptable to a receiving network element. Those skilled in the art will appreciate that a combination of the link channelization and the rate pacing elements of the present invention enables the innovative interface 200 to dynamically establish a data channel scaled to satisfy the communication capability of legacy network devices.

As introduced above, the 10 Gb/s attachment unit interface (XAUI) is comprised of four (4) full-duplex XAUI channels. As introduced above, each of the XAUI channels performs 8b/10b encoding to provide a 2.5 Gb/s data channel at a signaling rate of 3.125 Gb/s. In accordance with conventional implementations, the four lanes generated by the disparate channel(s) are aggregated to provide the 10 Gb/s data channel over a 12.5 Gb/s signaling rate. In accordance with one example implementation of the present invention, if the interface 200 is endowed with the 1 Gb/s MAC(s) 206, the multiplexer encoder/decoder module 208 selectively routes content to/from individual XAUI channels. According to one example implementation, two 1 Gb/s MAC(s) 206 are paired with a single XAUI channel, where each of the MAC(s) 206 can consume up to 1 Gb/s each of the 2.5 Gb/s channel bandwidth provided by each XAUI channel. If the 802.3ae MAC is selected (e.g., by switch 204), then all four channels are employed in support of the bandwidth requirements of the 802.3ae MAC 106. If one or more 1 Gb/s MAC(s) are selected (e.g., by switch 204), then one or more associated XAUI channels are employed in support of the bandwidth.

As introduced above, the multiplexer encoder/decoder module 208 selectively couples the XAUI interface 110 with one or more media access controller(s) (e.g., 106 and/or 206). In addition, module 208 employs the encoding/decoding features of conventional 802.3ae compliant encoder/decoder modules.

With continued reference to FIG. 2, in addition to the 10 Gb/s physical media interface of a conventional 802.3ae compliant interface (e.g., interface 100), the scalable network interface 200 may well include one or more physical media interface(s) 210. In accordance with one example implementation, the innovative scalable network interface 200 includes one or more 1 Gb/s physical media interface(s) 210, at least a subset of which are endowed with the same XAUI-channelization logic (not particularly denoted) on one and/or each end of the XAUI link, i.e. the PMI side, as well as the MAC side. This 'logic' takes care of the mapping of 1G channels onto XAUI and then back off XAUI and then sends them to the 1G logic which would send data out onto individual 1G channels. According to one example implementation, interface 200 comprises eight (8) 1 Gb/s physical media interface(s).

Those skilled in the art will appreciate, given the foregoing, that scalable network interface 200 enables an 802.3ae compliant network interface to interact and communicate with legacy equipment that conventional interface(s) do not provide. In this regard, the innovative interface provides a heretofore unavailable migration path from legacy Ethernet implementations to the exciting 10 Gb/s Ethernet architecture.

Figure 3:
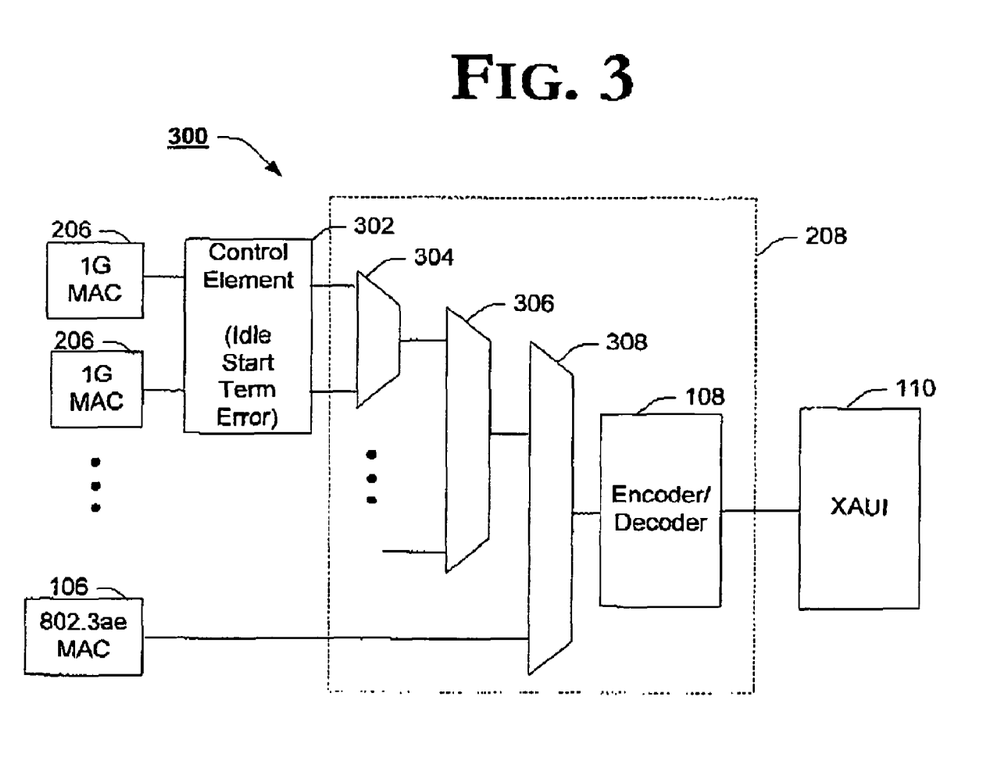
FIG. 3 is a more detailed block diagram of certain elements of the example network interface of FIG. 2, according to one example implementation of the present invention.

FIG. 3 illustrates a block diagram of an example architecture for implementing the teachings of the present invention, in accordance with but one example embodiment of the present invention. In accordance with the illustrated example of FIG. 3, a number of 1 Gb/s MAC(s) 206 are coupled through a control element 302 to a multiplexer encoder/decoder module 208, which selectively applies content to/from one or more MAC(s) 106 and/or 206 to an appropriate one or more XAUI channels of XAUI interface 110. Although depicted as a separate functional element, those skilled in the art will appreciate that control element 302 may well be embodied as a control input into the data stream from a 1 Gb/s MAC 206 to the encoder/decoder module 208. As shown, control element 302 includes an Idle feature to facilitate selective invocation of the rate-pacing features introduced above.

In accordance with the illustrated example implementation, multiplexer 308 effectively selects either an 802.3ae compliant MAC 106 or one or more 1 Gb/s MAC(s) to implement the dynamic channelization features of the present invention. If a sub-10 Gb/s data channel is required, one or more 1 Gb/s MAC(s) 206 are employed and selectively switched to encoder/decoder 108 using one or more multiplexing elements 304 through 306. In such an implementation, the one or more 1 Gb/s MAC(s) are selectively applied to one or more XAUI channels of XAUI interface 110, which establishes a virtual data channel within the physical 10 Gb/s data channel.

Example Implementation and Operation

Having introduced the operational and architectural elements of the present invention with reference to FIGS. 2 and 3, above, reference is next directed to FIGS. 4-8, wherein certain aspects of the present invention are developed in greater detail. For ease of explanation, the dynamic channelization features of the present invention will be developed in the context of preparing content for transmission to a remote network element. It will be appreciated by those skilled in the art, however, that the dynamic channelization features of the present invention are similarly invoked to enable the scalable network interface 200 to receive content from lower bandwidth, legacy network devices.

Figure 4:
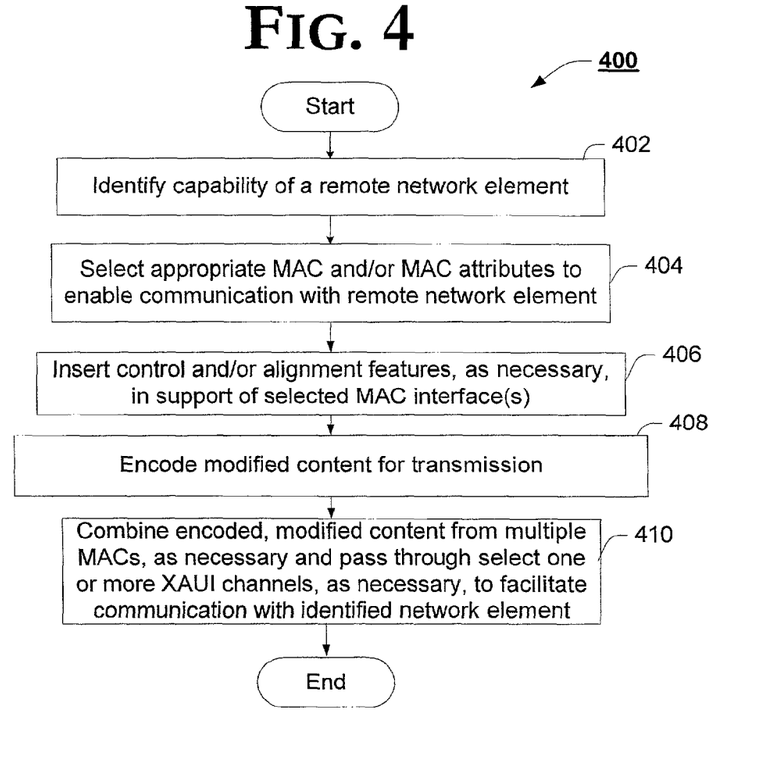
FIG. 4 is a flow chart of an example method of implementing a scalable network interface in accordance with the teachings of the present invention.

FIG. 4 is a flow chart of an example method of implementing a scalable network interface in accordance with the teachings of the present invention. In accordance with the illustrated example implementation of FIG. 4, the method begins in block 402 wherein network interface 200 identifies the communication capability of a remote network element. As introduced above, network interface 200 includes control logic 202, which selectively implements features to identify the communication capability of a remote network element. In accordance with one example implementation, control logic 202 communicates with the remote device to identify an acceptable communication rate. Alternatively, control logic 202 may well receive broadcast messages from the remote device advertising its communication capability.

In block 404, network interface 202 selects an appropriate media access controller(s) 106 and/or 206, and/or MAC attribute(s) to enable communication with the remote network device. In accordance with the teachings of the present invention, control logic 202 identifies the communication capability of the remote network device and, if the remote network device supports the 10 Gb/s data channel of the 802.3ae MAC, the 802.3ae MAC 106 is selected. If not, network interface 200 selectively invokes the dynamic channelization features of the present invention to facilitate communication with the legacy network device. A flow chart of an example method for implementing the dynamic channelization aspects of the present invention is detailed more fully below, with reference to FIG. 5.

In block 406, network interface 200 selectively inserts control and/or alignment features, as necessary, in support of the selected MAC interface(s) 106 and/or 206. That is, network interface 200 provides for the interjection of control elements as well as alignment elements to facilitate communication over any of a number of data channel rates. The alignment content is introduced when multiple lanes are used to realize a desired data channel. In accordance with one example implementation, such alignment content is not required until the data channel implemented by network interface 200 exceeds 2Gb/s, i.e., exceeds a single XAUI channel. As will be developed more fully below, such alignment features may well be introduced at the XAUI channel processing phase.

In accordance with one aspect of the present invention, network interface 200 may well implement rate-pacing features, wherein the effective data channel is further reduced by introducing "idle" control elements in between successive packet(s) of substantive content. An example method for implementing the rate-pacing features of the present invention is presented more fully with reference to FIG. 7.

In block 408, the content is delivered to multiplexer encoder/decoder module 208, wherein the content is encoded for transmission to the remote device. As introduced above, according to one example implementation, MUX encoder/decoder module 208 selects one or more lanes of the XAUI interface 110, and encodes the content bound for the one or more XAUI channels. According to one example implementation, the number of XAUI channels selected is based, at least in part, on the bandwidth required of the virtual data channel to be established within the 10 Gb/s data channel.

In block 410, the encoded content is selectively passed to one or more channels of the XAUI interface 110 to combine the encoded content from one or more MAC(s), as necessary, to facilitate communication with the identified network element. To facilitate a 10 Gb/s channel, mux encoder/decoder module 208 routes content from 10 Gb/s MAC through encoder 108 to each of the four XAUI channels of the XAUI interface 110. To facilitate sub-10 Gb/s channel, mux encoder/decoder 208 selectively routes content from one or more 1 Gb/s MAC(s) through the encoder/decoder 108 to one or more XAUI channel(s) of XAUI interface 110. In this regard, network interface 200 provides a flexible, scalable alternative to conventional 802.3ae network interfaces, providing a means through which an 802.3ae compliant network interface can facilitate communications with legacy devices.

Figure 5:
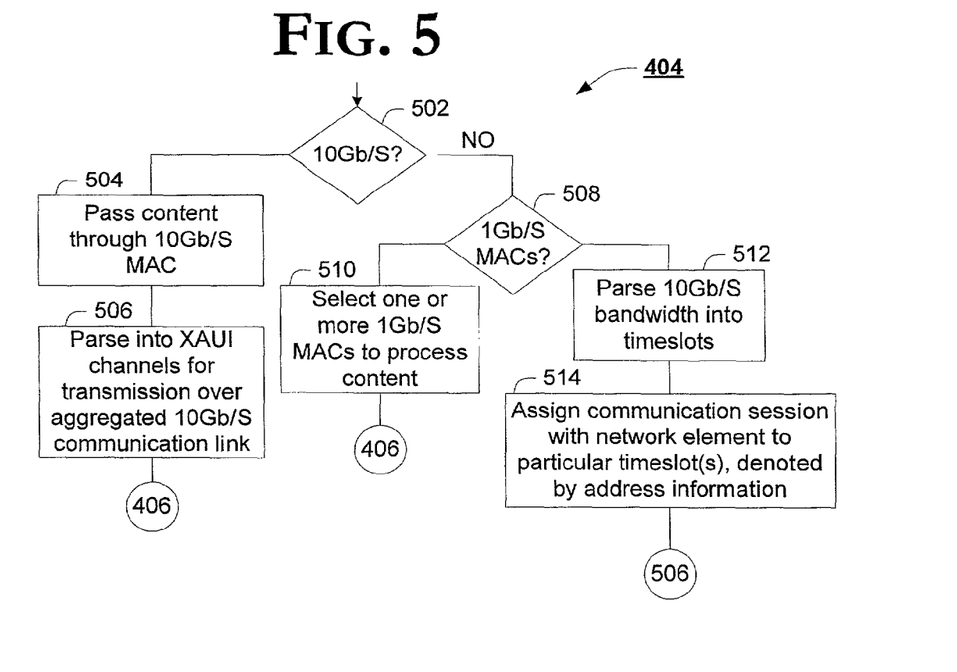
FIG. 5 is a flow chart of an example method for dynamic link channelization, in accordance with one aspect of the present invention.

Turning to FIG. 5, a flow chart of an example method for dynamic link channelization, in accordance with one aspect of the present invention is presented. In accordance with the illustrated example implementation of FIG. 5, the method of block 406 begins with block 502 wherein a determination is made of whether the remote network device will support a 10 Gb/s data channel. As introduced above, this determination is made by control logic 202 implementing any of a number of auto-negotiation features.

If the remote network device does, in fact, support 802.3ae compliant communication, content received from the host device is passed through a 10 Gb/s MAC 106 of the network interface in block 504.

In block 506, the content is encoded and multiplexed to multiple XAUI channels for transmission over the aggregated 10 Gb/s communication link. In accordance with the illustrated example implementation of FIG. 2, the content is passed from the 10G MAC 106 to the mux encoder/decoder module 208, which encodes the content and parses it to the four (4) XAUI channels of XAUI interface 110. In this regard, scalable network interface 200 is intended to represent the functionality of conventional 802.3ae compliant network interfaces.

Where the scalable network interface 200 deviates from conventional operation, however, is in its support of lower data channel rates. In this regard, if in block 502 the control logic detects that the remote network device does not support a 10 Gb/s data channel, a further determination is made of whether the network interface 200 is endowed with 1 Gb/s MAC(s) 206, block 508. If so, one or more of the 1 Gb/s MAC(s) 206 are dynamically selected to process content, block 510. Such content is encoded and selectively multiplexed to one or more XAUI channel(s), as necessary, to support the sub- 10 Gb/s data channel, as introduced above.

If, in block 508, network interface 200 is not endowed with the 1 Gb/s MAC(s) 206 an otherwise conventional 802.3ae MAC may well be enhanced with timeslicing features to support establishment of a reduced-rate data channel within the 10 Gb/s channel, facilitating communication with legacy network devices. In this regard, the process continues with block 512, where the enhanced 10 Gb/s MAC (the EXMAC, introduced above) parses the 10 Gb/s bandwidth into multiple timeslots. According to one example implementation, the number of timeslots generated is predetermined. In an alternate implementation, the EXMAC dynamically calculates the number of timeslots necessary to effect the reduced-rate data channel acceptable to the remote network device. If, for example, a 1 Gb/s data channel is supported by the remote network device, EXMAC selectively invokes timeslicing features and parses the 10 Gb/s bandwidth into ten (10) discrete timeslots, populating one of such timeslots with substantive content of the data channel.

In block 514, EXMAC assigns a communication session with the network elements to particular timeslot(s), denoted by address information associated with at least the remote network element. According to one example implementation, the remaining timeslots are left empty. In alternate implementation, the remaining timeslots are stuffed with one or more of, e.g., control data, junk data denoting unused timeslots, etc.

In this regard, alternate methods of implementing the dynamic channelization features of the present invention have been described. As introduced above, however, additional modifications to the effective bandwidth of such virtual channels may be realized with selective invocation of the rate pacing aspect of the present invention. An example method of implementing rate pacing is presented with reference to FIG. 6, below.

Figure 6:
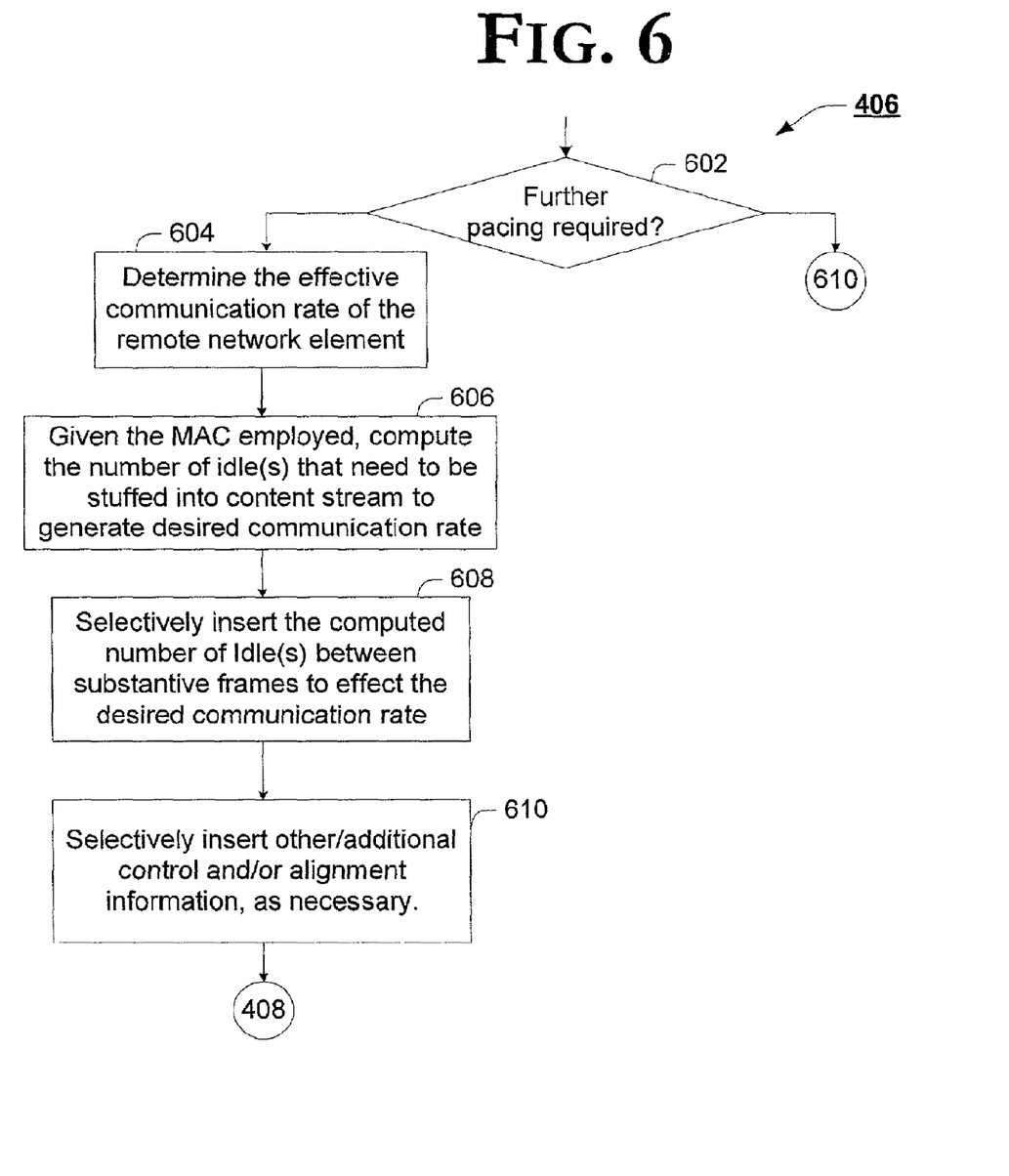
FIG. 6 is a flow chart of an example method for rate pacing within a network channel, in accordance with one aspect of the present invention.

FIG. 6 is a flow chart of an example method for rate pacing within a network channel, in accordance with one aspect of the present invention. In accordance with the illustrated example implementation of FIG. 6, the method begins with block 602 wherein control logic 202 determines whether additional rate pacing is required. In this regard, control logic 202 through, e.g., the auto-negotiation features determines that the remote network device is well-suited to communicate at a non-standard data rate.

As introduced above, a MAC (e.g., 106, 206) enhanced to include the rate pacing aspect of the present invention will "stuff" idle control elements (packets, frames, etc.) into a data stream between substantive frames (i.e., those frames carrying content associated with the actual communication between the elements), as necessary, to reduce the effective data rate of the communication link. Accordingly, in block 606 the enhanced MAC of substantive frames computes the number of idle control elements that are to be inserted between substantive frames to effect the desired data rate. This aspect of the present invention is graphically illustrated with reference to FIG. 7.

Figure 7:
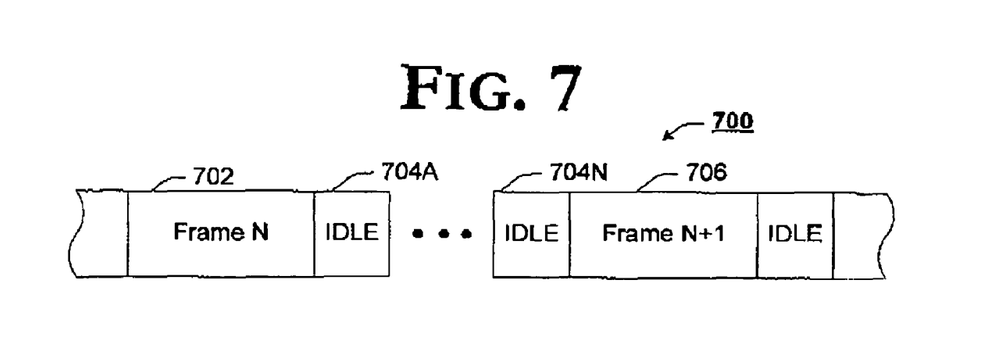
FIG. 7 is a graphical illustration of an example sequence of frames illustrating the rate pacing aspect of the present invention, according to one example implementation of the present invention.

Turning briefly to FIG. 7, a graphical representation of the rate pacing element of the present invention is presented, in accordance with one aspect of the present invention. As introduced above, the rate pacing aspect of the present invention is implemented, e.g., within an enhanced MAC, which selectively inserts idle control datagrams in between consecutive datagrams comprising substantive content. More particularly, FIG. 7 denotes a series of datagrams (e.g., packets, frames, etc.) 700 wherein a first datagram N 702 populated with substantive data associated with the communication session between the network devices is separated from a subsequent datagram N+1 706 by one or more intervening datagrams 704A . . . N comprising idle control elements. The number of intervening idle control elements 704A . . . N effectively slows that rate at which substantive datagrams 702, 706, etc. are received, thereby reducing the effective data rate of the communication channel below that otherwise provided by the MAC (e.g., 10 Gb/s, 1 Gb/s, etc.). In this regard, a MAC enhanced with the rate pacing aspect of the present invention may well support any standard or non-standard data rate requested by a remote network element.

Returning to block 608 in FIG. 6, the MAC selectively inserts the computed number of idle elements between substantive frames to effect the desired communication rate.

In accordance with network requirements, the process continues with block 610 wherein additional control/alignment control elements are introduced into the data stream, as necessary, as the process continues with block 408.

Example Network Implementation(s)

Figure 8:
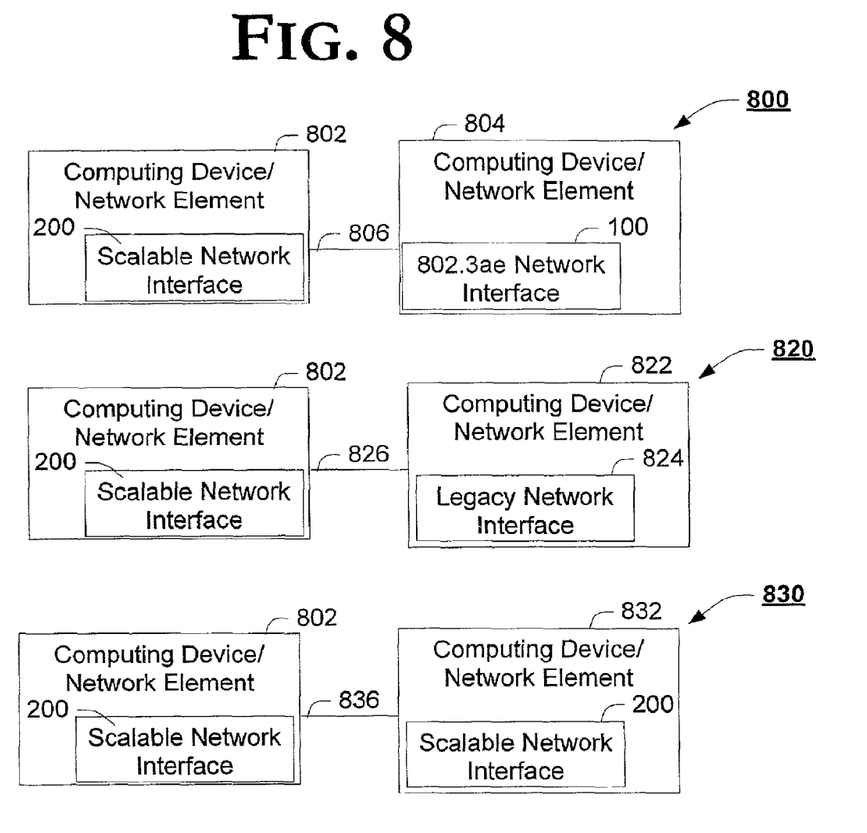
FIG. 8 is a block diagram of example networking embodiments of the scalable network interface, in accordance with the teachings of the present invention.

Having introduced various innovative aspects of the present invention, above, a number of alternate network implementations of the innovative scalable network interface 200 are presented with reference to FIG. 8. In this regard, FIG. 8 illustrates block diagram(s) of example network implementations depicting the flexibility enabled by the scalable network interface, in accordance with the teachings of the present invention.

With reference to example implementation 800, a computing device/network element 802 is endowed with the scalable network interface 200 incorporating one or more of the dynamic channelization and/or rate pacing aspects of the present invention. As shown, computing device/network element 802 is coupled to a remote computing device/network element 804 comprising a conventional 802.3ae compliant network interface 100 through a communication link 806. As used herein, computing device/network elements 802, 804 are intended to represent such computing appliances and/or network elements commonly known in the art including, but not limited to, a computer system, a server system, a network switch, a network hub, etc.

In accordance with the teachings of the present invention, scalable network interface 200 employs auto-negotiation feature(s) to identify the communication capability of remote network element 804. In so doing, scalable network interface 200 identifies conventional network interface 100 as being 802.3ae compliant, capable of up to a 10 Gb/s data channel over communication link 806. However, although endowed with an 802.3ae compliant network interface, computing device/network element 804 may not be able to consume data at such a rate. Accordingly, scalable network interface 200 selectively invokes the dynamic channelization and/or rate pacing features of the present invention to facilitate the processing capability of the remote network element 804.

In network implementation 820, computing device/network element 802 is communicatively coupled with computing device/network element 822 including a legacy network interface 824 via communication link 826. As used herein, legacy network interface is intended to represent any of a wide variety of legacy Ethernet network interface(s) such as, for example, a 10 Mb/S interface, a 100 Mb/S interface and/or a 1 Gb/s interface.

In accordance with the teachings of the present invention, introduced above, scalable network interface 200 employs auto-negotiation feature(s) to identify the communication capability of remote network element 824. In so doing, scalable network interface 200 identifies the communication capability of the legacy network interface 824 and selectively invokes one or more of dynamic channelization and/or rate pacing to establish a communication link 826 suited to the capability of the remote network device 822. In this regard, implementation 822 graphically depicts the ability of scalable network interface 200 to establish a communication link with legacy devices.

Turning to network implementation 830, a computing device/network element 802 is communicatively coupled to another computing device/network element 832 similarly endowed with a scalable network interface 200 via communication link 836. In this regard, the scalable network interface(s) 200 invoke the auto-negotiation features introduced above to agree on an acceptable data rate for the communication link 836. According to one implementation, introduced above, although the scalable network interface supports 10 Gb/s data rates, the host computing device/network element 832 may not. Accordingly, the scalable network interface(s) 200 agree, through auto-negotiation, on a virtual channel size that is suited to the processing and/or internal bus speeds of the host device(s) 802, 832, respectively.

Alternate Embodiment(s)

Figure 9:
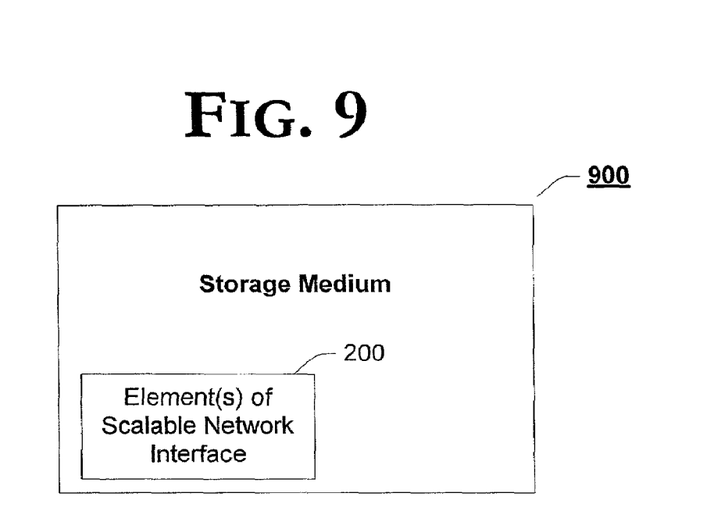
FIG. 9 is a block diagram of an example storage medium comprising a plurality of executable instructions which, when executed, cause an accessing machine to implement one or more aspects of the innovative communication agent of the present invention, in accordance with an alternate embodiment of the present invention.

FIG. 9 is a block diagram of an example storage medium comprising a plurality of executable instructions which, when executed, cause an accessing machine to implement one or more aspects of the innovative scalable network interface 200 of the present invention, in accordance with an alternate embodiment of the present invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 2 or 3, or may be embodied in machine-executable instructions, which may be used to cause a general-purpose or special-purpose processor or logic circuits programmed with the instructions to perform the steps. Alternatively, the steps may be performed by a combination of hardware and software. Moreover, although the invention has been described in the context of a network interface device, those skilled in the art will appreciate that such functionality may well be embodied in any of number of alternate embodiments such as, for example, integrated within a computing device, and is readily adaptable to wireless Ethernet implementations as well as the wired environment described herein.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

The invention claimed is:

1. An apparatus comprising:
   a plurality of media access controllers (MACs), wherein at least two of the plurality of MACs are to transmit at different data rates;
   a first logic to select at least one of the plurality of MACs to provide a communication channel with a remote network device,
   wherein the first logic comprises: a control logic to identify a processing capability of the remote network device, wherein the control logic is to select a MAC among the plurality of MACs for use in the communication channel with the remote network device based, at least in part, on the identified processing capability of the remote network device being substantially equal to a transmission rate of the selected MAC;
   and a second logic to reduce an effective data rate of the communication channel with the remote network device based, at least in part, on the identified processing capability of the remote network device, in support of the selected MAC, if necessary,
   wherein to reduce the effective data rate, the second logic is to insert one or more idle control elements between at least two frames of substantive content based, at least in part, on the identified processing capability of the remote network device.

2. An apparatus according to claim 1, wherein the second logic is to insert the one or more idle control elements based on a data rate of the communication channel.

3. An apparatus according to claim 1, wherein the control logic is to send a capability request to the remote network device, and to receive a response to the capability request denoting at least the processing capability of the remote network device.

4. An apparatus according to claim 1, wherein the control logic is to receive a broadcast indication from the remote network device denoting at least the processing capability of the remote network device.

5. An apparatus according to claim 1, wherein the communication channel comprises an Ethernet compatible communications channel.

6. An apparatus according to claim 1, further comprising, if the selected MAC having a transmission rate substantially equal to the processing capability of the remote network device is not available, the control logic is to select, among the plurality of MACs, a MAC having a transmission rate higher than the processing capability of the remote network device, and to provide a virtual channel within the transmission capabilities of the higher transmission rate MAC to provide the communication channel with the remote network device based, at least in part, on the indentified processing capability of the remote network device.

7. An apparatus according to claim 1, further comprising, a 10 Gb/s attachment unit interface (XAUI) communicatively coupled to at least one of the plurality of MACs.

8. An apparatus according to claim 7, wherein the XAUI comprises multiple channels and wherein each of the plurality of MACs is to transmit over at least one of the multiple channels.

9. An apparatus according to claim 8, further comprising logic to inject one or more alignment elements in response to more than one of the multiple channels being used to receive fames from at least one of the plurality of MACs.

10. A method comprising:
selecting, at a first logic, at least one of a plurality of media access controllers (MACs) to provide a communication channel with a remote network device, wherein at least two of the plurality of MACs are to transmit at different data rates;
identifying, at a control logic, a processing capability of the remote network device, wherein the control logic, a processing capability of the remote network device, wherein the control logic is to select a MAC among the plurality of MACs for use in the communication channel with the remote network device based, at least in part, on the identified processing capability of the remote network device being substantially equal to a transmission rate of the selected MAC;
and slowing, at a second logic, an effective data rate of the communication channel with the remote network device based, at least in part, on the identified processing capability of the remote network device, in support of the selected MAC, if necessary,
wherein slowing the effective data rate comprises inserting one or more idle control elements between at least two frames of substantive content based, at least in part, on the identified processing capability of the remote network device.

11. A method according to claim 10, wherein identifying the processing capability of the remote network device comprises:
sending a capability request; and
receiving a response to the request denoting at least the processing capability of the remote network device.

12. A method according to claim 10, wherein identifying the processing capability of the remote network device comprises:
receiving an indication from the remote network device denoting at least the processing capability of the remote network device.

13. A method according to claim 10, further comprising establishing at least one virtual channel for the communication channel, each virtual channel having a data rate less than that of a maximum transmission rate of the selected at least one MAC.

14. A method according to claim 10, wherein at least the processing capability of the remote device is obtained through auto-negotiation.

15. A method according to claim 10, wherein a number of the one or more inserted elements reduces a rate at which substantive frames are received by the remote device to a level commensurate with the processing capability of the remote device.

16. A method according to claim 10, wherein the communication channel comprises an Ethernet compatible communications channel.

17. A non-transitory computer-readable storage medium comprising one or more instructions that when executed by a processor configure the processor to:
select at least one of a plurality of media access controllers (MACs) to provide a communication channel with a remote network device, wherein at least two of the plurality of MACs are to transmit at different data rates;
identify a processing capability of the remote network device;
select a MAC among the plurality of MACs for use in the communication channel with the remote network device based, at least in part, on the identified processing capability of the remote network device being substantially equal to a transmission rate of the selected MAC;
and slow an effective data rate of the communication channel with the remote network device based, at least in part, on the identified processing capability of the remote network device, in support of the selected MAC, if necessary,
wherein slowing the effective data rate comprises inserting one or more idle control elements between at least two frames of substantive content based, at least in part, on the identified processing capability of the remote network device.

18. The non-transitory computer-readable storage medium of claim 17, further comprising one or more instructions that when executed by the processor configure the processor to establish at least one virtual channel for the communication channel, each virtual channel having a data rate less than that of a maximum transmission rate of the selected at least one MAC.

19. The non-transitory computer-readable storage medium of claim 17, further comprising one or more instructions that when executed by the processor configure the processor to insert the one or more idle control elements based on a data rate of the communication channel.

* * * * *